United States Patent
Palmer et al.

[11] Patent Number: 5,942,977
[45] Date of Patent: Aug. 24, 1999

[54] RADIO TRANSPONDER

[75] Inventors: John P. Palmer, Pomona; Mohammad A. Asgari, Canyon Country, both of Calif.

[73] Assignee: Ludwig Kipp, Palm Beach, Fla.

[21] Appl. No.: 08/910,293

[22] Filed: Aug. 13, 1997

[51] Int. Cl.[6] .................................................. G08B 13/14
[52] U.S. Cl. .................................. 340/572.5; 340/825.54; 340/571; 343/745; 455/78; 455/41; 455/63; 455/83
[58] Field of Search ................................ 340/572.5, 539, 340/825.54, 825.21, 571; 343/176, 702, 900, 745; 342/51, 44, 42; 455/73, 74, 77, 78, 129, 89, 41, 83, 63, 64, 296, 302, 309, 310, 312

[56] References Cited

U.S. PATENT DOCUMENTS

| | | | |
|---|---|---|---|
| 3,689,885 | 9/1972 | Kaplan et al. | 340/825.34 |
| 4,019,181 | 4/1977 | Olsson et al. | 342/44 |
| 4,063,229 | 12/1977 | Welsh et al. | 340/571 |
| 4,196,418 | 4/1980 | Kip et al. | 340/825.31 |
| 4,274,089 | 6/1981 | Giles | 340/572 |
| 5,103,222 | 4/1992 | Hogen Esch et al. | 340/825.54 |
| 5,146,193 | 9/1992 | Sokola | 333/206 |
| 5,239,686 | 8/1993 | Downey | 455/78 |
| 5,287,113 | 2/1994 | Meier | 342/51 |
| 5,450,086 | 9/1995 | Kaiser | 342/42 |
| 5,504,485 | 4/1996 | Landt et al. | 342/42 |
| 5,512,878 | 4/1996 | Balch et al. | 340/572 |
| 5,541,604 | 7/1996 | Meier | 342/42 |
| 5,680,106 | 10/1997 | Schrott et al. | 340/572 |
| 5,710,458 | 1/1998 | Iwasaki | 257/679 |

*Primary Examiner*—Benjamin C. Lee
*Attorney, Agent, or Firm*—Amster, Rothstein & Ebenstein

[57] ABSTRACT

A transponder adapted to be used in a checkout or inventory control system is disclosed which transmits by modulating and re-radiating a transponder signal frequency derived from a carrier frequency received on a transmitting antenna. The transponder includes a dual mode antenna and circuitry which selectively operates the antenna to suppress undesired emission of the transponder signal frequency when the transponder is not transmitting. A terminating circuit is further disclosed which suppresses undesired emission of the transponder signal frequency by a demodulator portion of the transponder.

16 Claims, 2 Drawing Sheets

RADIO TRANSPONDER

FIELD OF THE INVENTION

The present invention relates to a transponder and more specifically to a transponder which re-radiates a modulated signal on a transponder frequency derived from a carrier frequency received on a transponder antenna.

BACKGROUND OF THE INVENTION

The present invention is advantageously applied to the construction and operation of a radio frequency identification (RFID) tag such as that disclosed in commonly owned U.S. Pat. No. 5,530,702 of Palmer et al. ("the '702 patent"), and to an article-identifying transmitter in a checkout or inventory control system such as described in commonly owned U.S. Pat. No. 5,239,167 to Kipp ("the '167 patent"), for which U.S. reissue patent application Ser. No. 08/501,944 filed Jul. 12, 1995 is under allowance at the time this application is being prepared. Applicants incorporate the '702 patent and the '167 patent herein by reference.

The '167 patent discloses a system for detecting multiple randomly disposed articles without moving or contacting the articles. As described in the '167 patent, an actuator signals transmitters (RFID tags) attached to each article to begin operating. Each transmitter then transmits a signal identifying the article in turn and then deactuates itself.

Among the applications for which the system disclosed in the '167 patent is adapted are a checkout system and an inventory control system such as for a supermarket or warehouse. To be practical for a checkout system, RFID tags must be inexpensive to manufacture, because they are applied to merchandise articles with no requirement or expectation of being returned by the customer.

At the same time, the RFID tag must be capable of reliably transmitting a multiple digit identifying signal, and must operate in such manner that its transmissions will be received despite that many other RFID tags will also be operating and transmitting identifying signals.

In the checkout or inventory control systems disclosed in the '167 and '702 patents, RFID tags transmit and receive signals to and from an interrogator transceiver (hereinafter, "the interrogator") over relatively short distances on the scale of a few meters or less. Frequency modulation (FM) would be expected to provide outstanding communication performance in a system constructed according to the present invention. However, at the time this application is being prepared, the additional cost of equipping each RFID tag with an FM receiver as compared to the cost of an amplitude modulation (AM) receiver would not justify using an FM receiver in the present transponder invention. The inventors have found that amplitude modulation will provide adequate performance over the relatively short communication range for which the invention is primarily intended.

In view of the design choice which has been made, the range-limiting constraint becomes the sensitivity of the receiving circuitry of the RFID tag. In view of this range limitation, the inventors have found that a transponder implementation in which the RFID tag transmits by re-radiating a carrier frequency derived from a received carrier frequency further helps to satisfy both transmission performance and cost considerations.

In the communication system for which the present invention is adapted to operate, the RFID tag transponder transmits on a transmitting frequency which is derived from, but different from the frequency of a carrier signal which is broadcasted by the interrogator. As will be appreciated, the use of a different transmitting frequency by the RFID tag transponder facilitates the separation by the interrogator of signals transmitted by transponders from the signals and carrier frequency transmitted itself.

As to the method by which the transmitting frequency is generated, the provision of a local oscillator and mixer in the transmitting circuitry of the transponder would be expected to increase the noise rejection for signals transmitted by the transponder. However, the inventors have found that the added cost of such circuitry would provide no advantage because the range-limiting constraint remains the sensitivity of the receiver portion of the transponder.

By way of background to the present invention, U.S. Pat. No. 3,944,928 describes a harmonic communication system. As described in the '928 patent, a transponder receives a fundamental carrier frequency, generates a harmonic frequency therefrom, and modulates the harmonic frequency with a pulse-width modulating signal provided by a code storage 40 contained on the transponder.

U.S. Pat. No. 4,656,478 describes a transponder having an antenna 12 which is tuned to a broadcasted frequency f0 and a diode 19 which generates a second harmonic frequency 2×f0 therefrom for re-radiation on tuned antenna lobes 14a and 14b.

U.S. Pat. No. 4,979,232 describes a solid state switch which permits both a transmitter 45 and a receiver 55 to share a common antenna. As described in the '232 patent, reverse bias is applied to a diode 15 to present high impedance to block damaging currents generated by transmitter 45 from reaching receiver 55.

However, none of the '928 patent, the '478 patent, or the '232 patent describe a system by which a transponder suppresses the undesired emission of harmonic frequencies while not transmitting.

Finally, U.S. Pat. No. 4,059,801 describes a "de-Q-ing" circuit used to lower the Q factor of a transmitting antenna during quiescent intervals between transmissions. However, the '801 patent does not describe a system which affirmatively detunes an antenna to a different frequency to prevent a broadcasted frequency from being received thereon during non-transmitting intervals.

Accordingly, it is an object of the present invention to provide a transponder implementation of an RFID tag which is low in cost and operates reliably to communicate information over a transmission range of a few meters or less.

It is a further object of the invention to provide a transponder which transmits by re-radiating a harmonic frequency of a broadcasted carrier frequency and which contains circuitry for suppressing unwanted emissions of that harmonic frequency while not transmitting.

SUMMARY OF THE INVENTION

These and other objects are provided by the radio frequency transponder of the present invention. The radio frequency transponder transmits information signals by modulating a harmonic frequency derived from a fundamental carrier frequency broadcasted by the interrogator.

The transponder of the present invention is constructed to meet the following objectives. First, the transponder generates a harmonic carrier frequency from an incoming broadcasted carrier frequency, modulates that harmonic carrier frequency with a multiple digit information signal, and transmits the modulated harmonic carrier signal for reception by the interrogator with a sufficient signal-to-noise ratio to permit the received data to be reliably discriminated.

Second, since the transponder operates within a communication system which performs checkout or inventory control, multiple RFID tag transponders receive signals on a carrier frequency broadcasted by the interrogator while only just one transponder transmits a signal at a particular time. Accordingly, the transponder disclosed herein contains specific circuitry in receiver and transmitter portions thereof which suppress undesirable emissions of the harmonic transmitting frequency when the transponder is not transmitting a signal.

DETAILED DESCRIPTION OF THE PREFERRED EMBODIMENTS

Figure 1:
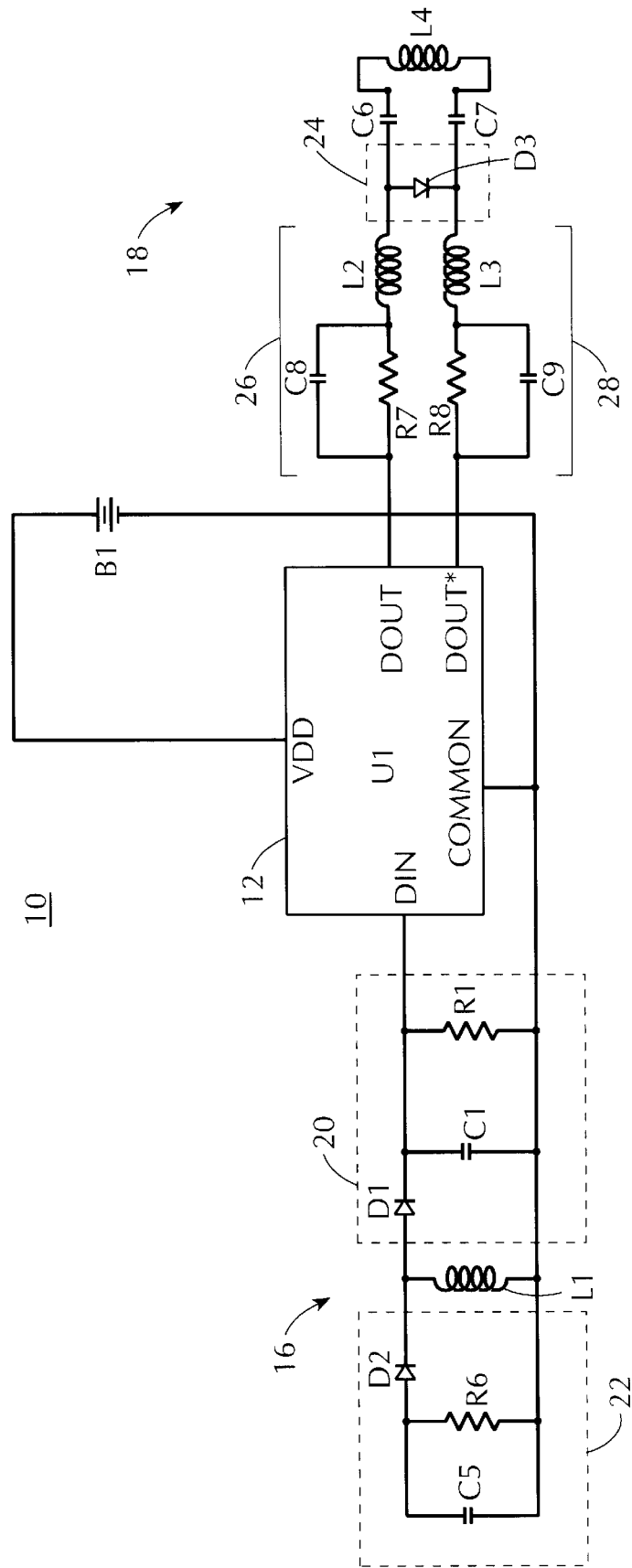
FIG. 1 is a block diagram showing the circuitry of the transponder of the present invention.

FIG. 1 shows a schematic circuit diagram of the radio transponder of the present invention. As shown in FIG. 1, transponder 10 includes a controller/information store 12, preferably implemented in an integrated circuit (U1) having memory and control logic, a battery B1, receiving circuitry 16, and transmitting circuitry 18.

Receiving circuitry 16 includes receiving antenna L1, a demodulator 20, and a terminating circuit 22. Demodulator 20 is preferably constructed as an envelope detector including a diode D1, capacitor C1, and resistor R1 having values appropriately matched to the carrier frequency f0 at which signals are transmitted to the transponder by the interrogator. The demodulated output of demodulator 20 is provided, preferably at baseband, to controller/information store 12 through terminal DIN.

Terminating circuit 22 suppresses the re-radiation by receiving antenna L1 of signal energy at the second harmonic frequency, i.e. 2×f0, and other even harmonics of the carrier frequency f0 transmitted by the interrogator. Because the second harmonic frequency is the transponder transmitting frequency, terminating circuit 22 is not specifically aimed at reducing, nor is required to reduce the emission of signal energy at odd harmonicas of the fundamental carrier frequency. Terminating circuit 22 includes elements which form a circuit which operates in an anti-symmetrical manner with respect to demodulator 20. Thus, in the preferred embodiment shown in FIG. 1, terminating circuit has elements including diode D2, capacitor C5 and resistor R6 forming a 'negative image' of the demodulator 20 formed by diode D1, capacitor C1, and resistor R1 and which operates to prevent modulation products at even harmonics of the fundamental carrier frequency from being introduced by demodulator 20 onto antenna L1 and being re-radiated.

Transmitting circuitry 18 has several functions: 1) to generate a transponder transmitting frequency as a harmonic of the carrier frequency transmitted by the interrogator; 2) to modulate an information signal onto that transmitting frequency for transmission to the interrogator; 3) to transmit the modulated information signal by re-radiating the transmitting frequency; and 4) while not transmitting, to suppress the undesired emission of the transmitting frequency.

Transmitting circuitry 18 includes transmitting antenna L4; a pair of capacitors C6 and C7; respective RLC circuits formed by: resistor R7, inductor L2, and capacitor C8; and resistor R8, inductor L3, and capacitor C9; and harmonic frequency generator and modulator 24. Preferably, RLC circuits are matched with respect to each other in impedance and amplitude-frequency characteristics. Harmonic frequency generator and modulator 24 preferably includes a diode D3 and is coupled to transmitting antenna L4 through capacitors C6 and C7. Transmitting circuitry 18 is coupled to complementary outputs DOUT and DOUT* of controller/information store 12 through respective RLC circuits.

RLC circuits 26 and 28 and coupling capacitors C6 and C7 have impedance and frequency characteristics such that when diode D3 is forward biased, transmitting antenna L4 is resonance tuned to the fundamental carrier frequency f0 transmitted by the interrogator. However, when diode D3 is reverse biased, current flow is prevented through diode D3, thereby causing antenna L4 to effectively become resonance tuned to twice the fundamental frequency, i.e. to the second harmonic 2×f0.

The following results obtain for each bias condition of diode D3. When diode D3 is forward biased by respective high and low level voltages on complementary outputs DOUT and DOUT*, transmitting antenna L4 is resonance tuned to the fundamental carrier frequency f0, thereby coupling energy received from the interrogator at that frequency to diode D3 which generates and modulates the second harmonic frequency 2×f0. As will be appreciated, the forward biasing point of diode D3 is selected in a non-linear region of operation such that a series of harmonic frequencies, including the second harmonic frequency 2×f0, are generated and coupled by diode D3 back onto transmitting antenna L4.

When diode D3 is reverse biased by respective low and high level voltages at complementary outputs DOUT and DOUT*, transmitting antenna L4 is resonance tuned to the second harmonic frequency, i.e. 2×f0. Under such condition, antenna L4 only poorly receives energy of the fundamental carrier frequency f0 broadcasted by the interrogator, with the result that re-radiation of the fundamental carrier frequency and its harmonics are suppressed on transmitting antenna L4.

The values and component types of the circuit elements utilized in the preferred embodiment of the invention disclosed herein are summarized in the following Table.

| Element | Value | Type |
| --- | --- | --- |
| B1 | 3 volt | Lithium battery |
| C1 | 2 pF | 805, NPO |
| C5 | 2 pF | 805, NPO |
| C6 | 2 pF | 805, NPO |
| C7 | 2 pF | 805, NPO |
| C8 | 3 pF | 805, NPO |
| C9 | 3 pF | 805, NPO |
| D1 | | HSMS 2852, SOT23 |
| D2 | | HSMS 2852, SOT23 |
| D3 | | HSMS 2820, SOT23 |
| U1 | | Orbit 6814A |
| L1 | 926 MHz, | 4.12 cm square |
| L2 | 40 nH, | 2.5 turn spiral |
| L3 | 40 nH, | 2.5 turn spiral |
| L4 | 1852 MHz, | 4.12 cm square |

-continued

| Element | Value | Type |
| --- | --- | --- |
| R1 | 100 k | 805, ERJ6 |
| R6 | 100 k | 805, ERJ6 |
| R7 | 1 k | 805, ERJ6 |
| R8 | 1 k | 805, ERJ6 |

Figure 2A:
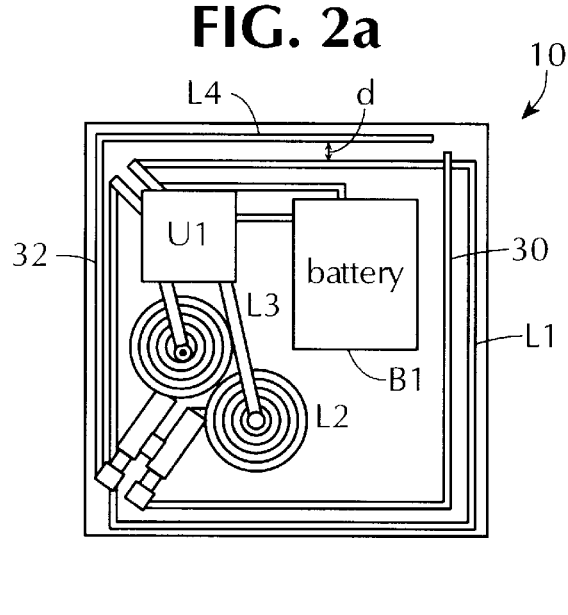
FIG. 2a is a diagram showing a physical implementation of the transponder of the present invention.
Figure 2B:
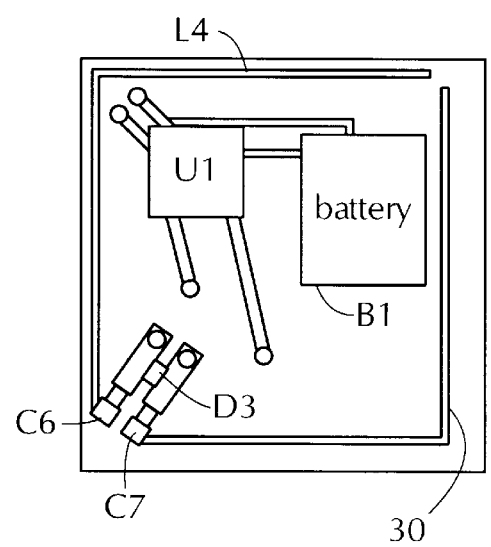
FIG. 2b is a diagram showing a front plan view of a front side of a physical implementation of the transponder.
Figure 2C:
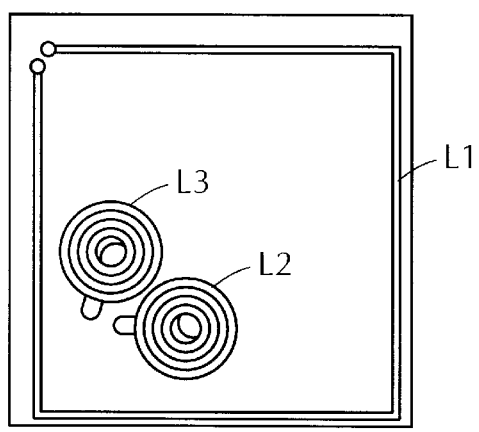
FIG. 2c is a diagram showing a front plan view of a rear side of a physical implementation of the transponder.
Figure 2D:
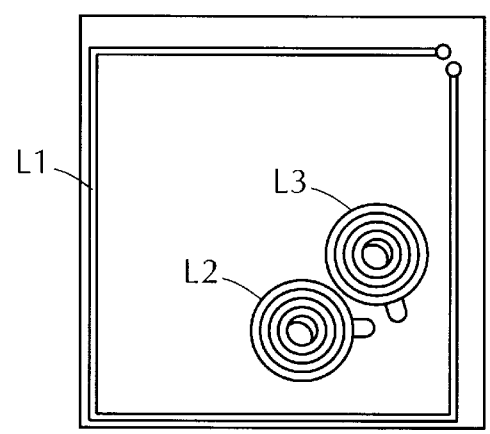
FIG. 2d is a diagram showing a rear plan view of a rear side of a physical implementation of the transponder.

FIGS. 2a–2d show respective views of a conductor pattern for a physical embodiment of the present invention. FIG. 2a shows conductor patterns for both front and rear patterned surfaces of a low profile transponder which is adapted to be attached to a surface of a merchandise article. As shown in FIG. 2a, inductors L2 and L3 are implemented in spiralled conductor patterns positioned on the rear side of transponder 10 (FIG. 2c), opposite the front side upon which transmitting antenna L4 is positioned. In FIG. 2b, integrated circuit U1 which implements controller/information store 12, battery B1, inductors L2 and L3 and receiving antenna L1 are connected by conductor patterns positioned on the front side of the transponder 10. It will be appreciated that integrated circuit U1, battery B1, and the connecting conductor patterns need not be placed on any particular side of transponder 10, and that it may be desirable in some circumstances to connect these elements with conductor patterns formed on both sides of transponder 10.

Antennas L1 and L4 are formed of conductors having roughly square loop patterns on respective front and rear sides of transponder 10. A loop shape was selected for antennas L1 and L4 because such shape reduces the influence of directional orientation on transmitting and receiving efficiency. This consideration is important for the intended communication system in which randomly oriented transponders must be capable of efficient communication with the interrogator.

It will be appreciated that the transmitting and receiving antennas L4 and L1 must be so positioned that transmitting signal energy present on transmitting antenna L4 not be absorbed excessively by receiving antenna L1 to prevent its transmission to the interrogator. In determining the placement of antennas L1 and L4, a further constraint exists in that the transponder must be contained in a small and unobtrusive package which can be utilized in a checkout or inventory monitoring system. Efficient utilization of the total surface area of the transponder is achieved when conductor patterns are placed on both front and rear sides of the package. Thus, in the embodiment shown in FIGS. 2a–2d, conductor patterns forming antennas L1 and L4 are placed on respective opposite sides of the transponder and are offset from each other such that neither antenna vertically overlays the other over any substantial unit of length and antennas L1 and L4 are separated from each other by a minimum separation of 3 mm when the width of the conductor patterns forming antennas L1 and L4 is 1.5 mm.

When sufficient surface area is available on a single side of the transponder, it will be appreciated that all transponder elements and conductor patterns can be fabricated on that single side. However, as is the case for transponders having conductor patterns on both sides, to maintain transmitting efficiency, conductor patterns forming antennas L1 and L4 should be kept apart by a minimum separation of 3 mm when the width of the conductor patterns forming antennas L1 and L4 is 1.5 mm.

Diode D3 which functions as harmonic generator and modulator 24 has cathode and anode terminals coupled to conductors 30, 32, which form a loop antenna L4 used for transmitting. When diode D3 is forward biased by respective high and low level voltages on complementary outputs DOUT and DOUT*, current flows through diode D3 over the combined length of conductors 30 and 32 which form transmitting antenna L4. By contrast, when diode D3 is reverse biased by respective low and high level voltages on complementary outputs DOUT and DOUT* diode D3 blocks the flow of current between conductors 30, 32.

The change in effective antenna length brought about by the different biasing conditions of diode D3 leads to changes in the resonant frequency of antenna L4. When diode D3 is forward biased to operate antenna L4 over its full length, antenna L4 resonates at the fundamental carrier frequency f0 of the interrogator. If diode D3 is positioned at the midpoint of antenna L4 such that each conductor 30, 32 is approximately half the full length of antenna L4, it will be appreciated each conductor 30, 32, when operated as a separate antenna, will resonate at twice the fundamental carrier frequency, i.e. 2×f0. Accordingly, when reverse bias is applied to diode D3, antenna L4 resonates at the second harmonic frequency. Under such condition, as explained above, little energy is transmitted by antenna L4 because the higher resonant frequency characteristic prevents energy at the fundamental frequency from being received on antenna L4 in the first instance. As will be appreciated from the foregoing, undesirable emissions of the second harmonic (transmitting) frequency can be substantially eliminated by maintaining reverse bias on diode D3 when the transponder is not transmitting.

It will be appreciated that the location of maximum current on antenna L4 due to the fundamental carrier frequency transmitted by the interrogator occurs at the midpoint of the conductor pattern for antenna L4, i.e. at the location of diode D3. Consequently, the maximum antenna current is coupled to diode D3 for generation and modulation of transmitting frequency.

With reference to the '167 and '702 patents, the operation of the transponder will now be described. Communication begins by the interrogator broadcasting a BEGIN signal on a fundamental carrier frequency to all the transponders which are located within a defined area such as an checkout system or an defined inventory area. The BEGIN signal is received by each transponder 10 on receiving antenna L1 and demodulated by demodulator 20 to provide input, preferably at baseband, through DIN terminal to controller/information store 12.

Receipt of the demodulated BEGIN signal by controller/information store 12 causes transponder 10 to switch from a quiesced state requiring only minimal power from battery B1 to a fully operational initialized state, at which time a counter included in controller/information store 12 (as shown in the '702 patent) begins counting up or down towards a time to transmit, which time is preferably determined pseudo-randomly for each transponder.

While transponder 10 counts towards its time to transmit, controller/information store 12 maintains reverse bias on diode D3 (by holding DOUT and DOUT* outputs at respective low and high level voltages) to cause transmitting antenna L4 to be detuned from the fundamental carrier frequency transmitted by the interrogator. In this way, transponder 10 suppresses the emission of energy at the transmitting frequency on transmitting antenna L4.

When the transponder 10 reaches its time to transmit, controller/information store 12 switches the polarities of complementary outputs DOUT and DOUT* in a controlled, timed sequence to provide a modulating information signal to transmitting circuitry 18. The modulating information signal applies forward and reverse bias to diode D3 in a controlled, timed sequence to cause diode D3 to generate corresponding timed pulses of energy at harmonics of the fundamental carrier frequency, which pulses are coupled back onto transmitting antenna L4 for transmission to the interrogator.

Preferably, controller/information store 12 switches the complementary outputs DOUT and DOUT* in such manner to produce a pulse-width modulating (PWM) signal. The inventors have found that a lower bit error rate can be obtained for the same signal energy when pulse width modulation transmission is utilized than with pulse amplitude modulation. In addition, PWM signals can be more easily and accurately clocked at the receiver. For the same reasons, PWM transmission is preferred for signals transmitted by the interrogator to transponders 10.

In the preferred PWM embodiment, a logic "0" pulse is represented scheme by holding the DOUT and DOUT* outputs at respective high and low level voltages over a short duty cycle (preferably about 25%) during each data bit interval, and a logic "1" pulse is represented by holding the DOUT and DOUT* outputs at respective high and low level voltages over a longer duty cycle (preferably about 75%) during each data bit interval.

Again with reference to the '702 patent, when the counter in an RFID tag transponder 10 reaches the pseudo-randomly determined time to transmit, the transponder 10 transmits a request to transmit signal, and then waits for acknowledgement from the interrogator before proceeding to transmit an article-identifying signal. Thus, the RFID tag transponder disclosed herein must be capable of receiving and responding to signals which are transmitted by the interrogator at different times during communication.

While the transponder 10 is operating, receiving circuitry 16 receives and demodulates all signals which are transmitted on the fundamental carrier frequency f0, although such operation is not specifically required. Controller/information store 12 ignores all such received signals except when it is determined that the received signal relates to the particular transponder 10. Terminating circuit 22, being matched in characteristic to the transponder transmitting frequency (i.e. 2×f0), suppresses unwanted emissions of that transmitting frequency that would otherwise result because of demodulator 20 remaining coupled to receiving antenna L1.

As evident from the foregoing description, the transponder of the present invention provides for more efficient and reliable communication of digital information on a single re-radiated transmitting frequency by suppressing the undesirable emission of that transmitting frequency from its own transmitting and receiving circuitry.

While the invention has been described herein with reference to specific embodiments thereof, those skilled in the art will appreciate the many modifications that can be made without departing from the scope and spirit of the appended claims.

What is claimed is:

1. A transponder, comprising:
    a transmitting antenna;
    a frequency generator and modulator coupled to said transmitting antenna, operative to generate a transmitting frequency from a broadcasted carrier frequency received on said transmitting antenna, and to modulate said transmitting frequency with an information signal;
    a receiving antenna;
    a demodulator coupled to said receiving antenna; and
    a first transmitting frequency suppressor coupled to said receiving antenna operating anti-symmetrically with respect to said demodulator.

2. The transponder of claim 1 further comprising an information store, operative to provide said information signal.

3. The transponder of claim 1 wherein said frequency generator and modulator generates said transmitting frequency as a harmonic of said carrier frequency.

4. The transponder of claim 1 wherein said frequency generator and modulator comprises a non-linear amplifier.

5. The transponder of claim 4 wherein said amplifier includes a diode.

6. The transponder of claim 1 wherein said transmitting antenna and said frequency generator and modulator are coupled to permit said transmitting frequency to be selectively suppressed when said transponder is not transmitting said information signal.

7. The transponder of claim 6 wherein said frequency generator and modulator includes a switch coupled between respective conductors forming said transmitting antenna.

8. The transponder of claim 7 wherein said switch includes a diode, said transponder further comprising control means operative to selectively bias said diode to suppress said transmitting frequency.

9. A low profile transponder, comprising:
    a pair of flat conductor patterns extending generally in loops within said transponder, a first said flat conductor pattern forming a transmitter antenna, and a second said flat conductor pattern forming a receiver antenna, said flat conductor patterns being generally separated from each other by a minimum separation to prevent said receiver antenna from absorbing excessive energy transmitted by said transmitter antenna, said flat conductor pattern forming said transmitter antenna being coupled to a switch at a midsection thereof, said switch including a diode selectively operable to alter a resonant frequency characteristic of said transmitter antenna; and
    means for transmitting and receiving modulated information signals on said respective transmitter and receiver antennas.

10. A transponder, comprising:
    a selectively operable dual mode antenna having a first mode resonant at a first frequency, and a second mode in which said first frequency is effectively suppressed; and
    control means for operating said antenna in said first mode while transmitting and in said second mode while not transmitting.

11. The transponder of claim 10 wherein said control means includes a modulator coupled to said antenna and operative to modulate a transmitting frequency generated from said first frequency with an information signal for transmission.

12. The transponder of claim 11 wherein said transmitting frequency is a harmonic of said first frequency.

13. A system for detecting multiple articles, comprising:
    an interrogator transceiver, operative to transmit an interrogating signal on an interrogator frequency and to receive response signals on a transponder frequency lying in predetermined relation to said interrogator frequency;
    a plurality of transponders, each attached to an article and operative to transmit said response signal modulated on said transponder frequency identifying each said attached article in turn, each said transponder including a transmitting antenna, controllable to suppress emission of said transponder frequency while not transmitting, and control means operative to switch said transmitting antenna between a transmitting mode and said mode in which said transponder frequency is suppressed.

14. The system of claim 13 wherein said transponder generates said transponder frequency as a harmonic frequency of said interrogator frequency received on said transmitting antenna.

15. The system of claim 13 wherein said response signal includes a multiple digit information signal.

16. The system of claim 13 wherein each transponder further comprises a receiving antenna and a transponder frequency suppressor coupled to said receiving antenna.

* * * * *